(12) United States Patent
Muppala et al.

(10) Patent No.: US 10,187,353 B2
(45) Date of Patent: Jan. 22, 2019

(54) BEHAVIORAL CLASSIFICATION OF NETWORK DATA FLOWS

(75) Inventors: Suresh Babu Muppala, Santa Clara, CA (US); Guy Riddle, Los Gatos, CA (US); Scott Andrew Hankins, Cupertino, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 560 days.

(21) Appl. No.: 13/151,141

(22) Filed: Jun. 1, 2011

(65) Prior Publication Data

US 2012/0079101 A1  Mar. 29, 2012

Related U.S. Application Data

(60) Provisional application No. 61/350,548, filed on Jun. 2, 2010.

(51) Int. Cl.
*H04L 12/26* (2006.01)
*H04L 29/06* (2006.01)
*H04L 12/851* (2013.01)

(52) U.S. Cl.
CPC ...... *H04L 63/0236* (2013.01); *H04L 63/1425* (2013.01); *H04L 29/06897* (2013.01); *H04L 43/18* (2013.01); *H04L 47/2441* (2013.01)

(58) Field of Classification Search
CPC .................................................. H04L 12/1408
See application file for complete search history.

(56) References Cited

U.S. PATENT DOCUMENTS

| | | | |
|---|---|---|---|
| 6,018,516 A | 1/2000 | Packer | |
| 6,038,216 A | 3/2000 | Packer | |
| 6,046,980 A | 4/2000 | Packer | |
| 6,412,000 B1 | 6/2002 | Riddle et al. | |
| 6,591,299 B2 | 7/2003 | Riddle et al. | |
| 7,032,072 B1 | 4/2006 | Quinn et al. | |
| 7,292,531 B1 | 11/2007 | Hill | |
| 7,296,288 B1 * | 11/2007 | Hill et al. | 726/2 |
| 7,366,101 B1 | 4/2008 | Varier et al. | |
| 7,697,418 B2 * | 4/2010 | Rabinovitch | 370/218 |
| 7,712,134 B1 * | 5/2010 | Nucci et al. | 726/23 |
| 7,778,194 B1 * | 8/2010 | Yung | 370/252 |
| 7,908,655 B1 * | 3/2011 | Bhattacharyya et al. | 726/22 |
| 7,962,611 B2 * | 6/2011 | Hurley et al. | 709/224 |
| 7,996,895 B2 * | 8/2011 | Chen et al. | 726/22 |
| 8,204,974 B1 * | 6/2012 | Bhattacharyya | H04L 41/142 709/223 |
| 8,220,055 B1 * | 7/2012 | Kennedy | G06F 21/50 726/22 |
| 8,341,740 B2 * | 12/2012 | Abdel-Aziz et al. | 726/23 |
| 2003/0105976 A1 * | 6/2003 | Copeland, III | 713/201 |

(Continued)

OTHER PUBLICATIONS

Weidong Wu . "Packet Forwarding Technologies." Auerbach Publications (CRC Press): Dec. 17, 2007. Chapter 3: Classic Schemes (pp. 69-105).*

(Continued)

*Primary Examiner* — Oscar A Louie
*Assistant Examiner* — Benjamin Jenkins
(74) *Attorney, Agent, or Firm* — Maschoff Brennan

(57) ABSTRACT

Methods, apparatuses and systems facilitating enhanced classification of network traffic based on observed flow-based and/or host-based behaviors.

14 Claims, 7 Drawing Sheets

(56) References Cited

U.S. PATENT DOCUMENTS

| | | | | |
|---|---|---|---|---|
| 2004/0083372 | A1* | 4/2004 | Williamson et al. | 713/188 |
| 2005/0289245 | A1* | 12/2005 | Griffin | H04L 29/06 |
| | | | | 709/249 |
| 2007/0180526 | A1* | 8/2007 | Copeland, III | H04L 63/1416 |
| | | | | 726/23 |
| 2007/0289017 | A1* | 12/2007 | Copeland, III | 726/23 |
| 2009/0172815 | A1* | 7/2009 | Gu et al. | 726/23 |

OTHER PUBLICATIONS

Animesh Kr Trivedi, Rishi Kapoor, Rajan Arora, Sudip Sanyal, and Sugata Sanyal. "RISM—Reputation Based Intrusion Detection System for Mobile Adhoc Networks." 3rd International Conference on Computers and Devices for Communication (CODEC-06)—Institute of Radio Physics and Electronics, University of Calcutta, Dec. 18-20, 2006.*

Xia Tianming, Song Ruiqi. "A Method of P2P Traffic Identification on Internet Based on the Deep Flow Inspection." 2009 International Conference on Communication Software and Networks: Feb. 27-28, 2009.*

Pete Loshin. "TCP/IP Clearly Explained: the Morgan Kaufmann Series in Networking." Published by Morgan Kaufmann: 2003. Chapters 3, 15, and 17.*

* cited by examiner

| IP Address | Conn | RTT to PS | Curr Rate | 1 Min Avg | Peak Rate | *New Flows Per Minute* | | |
|---|---|---|---|---|---|---|---|---|
| | | | | | | Client | Server | Failed |
| 216.203.49.219 | 0 | 80ms | 2730 | 420 | 2730 | 0 | 90 | 0 |
| 216.148.237.158 | 1 | 14ms | 235k | 19.1k | 235k | 0 | 84 | 0 |
| 216.148.237.145 | 5 | 48ms | 2303 | 4871 | 49k | 0 | 64 | 0 |
| 10.7.15.8 | 11 | 3ms | 310k | 58.9k | 310k | 42 | 0 | 0 |
| 10.255.255.255 | 2 | *** | 3397 | 3464 | 17.6k | 0 | 28 | 0 |
| 10.7.15.4 | 0 | *** | 654 | 190 | 1112 | 11 | 6 | 0 |
| 10.1.1.40 | 0 | *** | 643 | 188 | 1112 | 6 | 11 | 0 |
| 207.46.249.61 | 0 | 25ms | 15.2k | 20.5k | 220k | 0 | 14 | 0 |
| 10.1.1.16 | 1 | *** | 3657 | 2905 | 17.7k | 0 | 11 | 0 |
| 255.255.255.255 | 1 | *** | 1735 | 430 | 5357 | 0 | 4 | 0 |
| 10.7.11.2 | 0 | *** | 0 | 0 | 11.1k | 3 | 0 | 0 |
| 10.7.15.13 | 2 | *** | 549 | 252 | 11.3k | 0 | 3 | 0 |
| 66.218.71.83 | 2 | 124ms | 492 | 4217 | 90.6k | 0 | 2 | 0 |
| 10.2.1.10 | 0 | *** | 0 | 0 | 343 | 1 | 0 | 0 |
| 239.255.255.253 | 2 | *** | 39 | 25 | 1305 | 0 | 1 | 0 |
| 10.7.15.5 | 0 | *** | 485 | 318 | 8787 | 1 | 0 | 0 |
| 10.1.1.18 | 1 | *** | 1349 | 771 | 2091 | 1 | 0 | 0 |
| 10.10.254.74 | 0 | *** | 0 | 54 | 345 | 1 | 0 | 0 |
| 10.10.253.70 | 0 | *** | 0 | 0 | 37 | 0 | 0 | 0 |
| 10.7.31.22 | 0 | *** | 0 | 0 | 2 | 0 | 0 | 0 |

Fig. 5 ously. Certain loading
BEHAVIORAL CLASSIFICATION OF NETWORK DATA FLOWS

CROSS-REFERENCE TO RELATED APPLICATIONS

The present application claims priority to U.S. Provisional Application Ser. No. 61/350,548 filed Jun. 2, 2010 and entitled "Behavioral Classification of Network Data Flows," the entirety of which is incorporated by reference herein for all purposes.

TECHNICAL FIELD

The present disclosure relates to computer networks and, more particularly, to enhanced network traffic classification mechanisms.

BACKGROUND

Efficient allocation of network resources, such as available network bandwidth, has become critical as enterprises increase reliance on distributed computing environments and wide area computer networks to accomplish critical tasks. The widely-used Transport Control Protocol/Internet Protocol (TCP/IP) protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window.

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. In addition, routers can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to ensure a minimum bandwidth and/or cap bandwidth as to a particular class of traffic. An administrator specifies a traffic class (such as FTP data, or data flows involving a specific user) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions.

While the systems and methods discussed above that allow for traffic classification and application of bandwidth utilization controls on a per-traffic-classification basis operate effectively for their intended purposes, they possess certain limitations. Identification of traffic types associated with data flows traversing an access link typically involves the application of matching criteria or rules to explicitly presented or readily discoverable attributes of individual packets against an application signature which may comprise a protocol identifier (e.g., TCP, HTTP, UDP, MIME types, etc.), a port number, and even an application-specific string of text in the payload of a packet. After identification of a traffic type corresponding to a data flow, a bandwidth management device associates and subsequently applies bandwidth utilization controls (e.g., a policy or partition) to the data flow corresponding to the identified traffic classification or type. Accordingly, simple changes to an application, such as a string of text appearing in the payload or the use of encryption text may allow the application to evade proper classification and corresponding bandwidth utilization controls or admission policies. In addition, the rapid proliferation of network applications in general presents challenges to developers of network traffic classification mechanisms to constantly monitor for new application types and create new classification rules.

SUMMARY

The present invention provides methods, apparatuses and systems facilitating enhanced classification of network traffic based on observed flow-based and/or host-based behaviors. As discussed above, typical mechanisms that classify network traffic analyze explicitly presented or readily discoverable attributes of individual packets against an application signature, such as a combination of protocol identifiers, port numbers and text strings. The present invention extends beyond analysis of such explicitly presented packet attributes and holistically analyzes the data flows, and in some implementations, the behavior of host or end systems as expressed in related data flows against rule sets based on behaviors and aggregated behaviors expressed in index values. Implementations of the present invention can be incorporated into a variety of network devices, such as traffic monitoring devices, packet capture devices, firewalls, and bandwidth management devices.

DESCRIPTION OF THE DRAWINGS

FIG. 5 illustrates the data flow metrics maintained in a host database according to an embodiment of the present invention.

DESCRIPTION OF PREFERRED EMBODIMENT(S)

Figure 1:
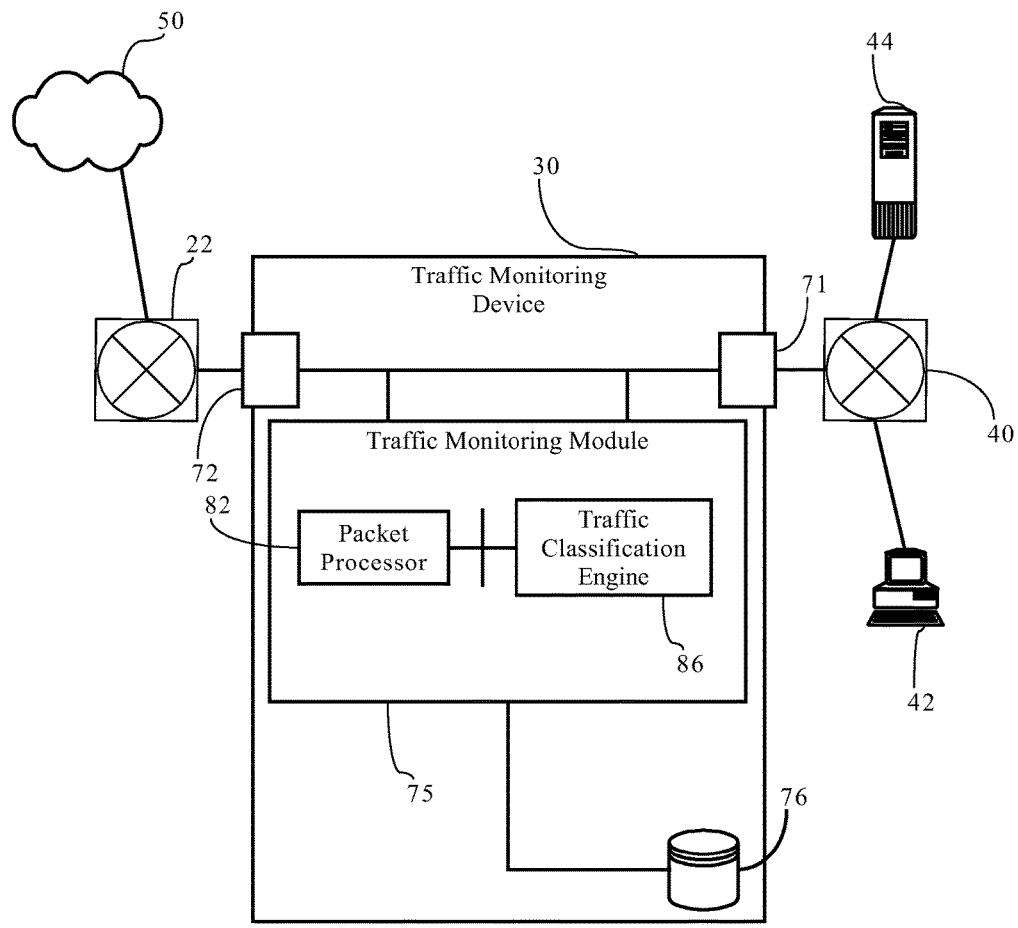
FIG. 1 is a functional block diagram showing a traffic monitoring device according to an embodiment of the present invention.

FIG. 1 illustrates a basic network environment in which an embodiment of the present invention operates. FIG. 1 shows a first network device 40 (such as a hub, switch, router, and/or a variety of combinations of such devices implementing a LAN or WAN) interconnecting two end-systems (here, client computer 42 and server 44). FIG. 1 also provides a second network device 22, such as a router, operably connected to network cloud 50, which in one implementation could be an open, wide-area network. As FIG. 1 shows, traffic monitoring device 30 comprises traffic monitoring module 75, and first and second network interfaces 71, 72, which operably connect traffic monitoring device 30 to the communications path between first network device 40 and second network device 22. Traffic monitoring module 75 generally refers to the functionality implemented by traffic monitoring device 30. In one embodiment, traffic monitoring module 75 is a combination of hardware and software, such as a central processing unit, memory, a system bus, an operating system and one or more software modules implementing the functionality described herein. In one embodiment, traffic monitoring module 75 includes a packet processor 82, and a traffic classification engine 86. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the flows. The traffic classification engine 86, as discussed more fully below, is operative to classify data flows based on one or more attributes associated with the data flows. Traffic classification engine 86 is also operative to classify data flows based on a heuristic comparison of certain observed behavioral attributes of the data flows relative to a set of at least one known application behavior pattern.

The functionality of traffic monitoring device 30 can be integrated into a variety of network devices that classify network traffic, such as firewalls, gateways, proxies, packet capture devices (see U.S. application Ser. No. 10/453,345), network traffic monitoring and/or bandwidth management devices, that are typically located at strategic points in computer networks. In one embodiment, first and second network interfaces 71, 72 are implemented as a combination of hardware and software, such as network interface controllers and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic monitoring device 30, in one embodiment, includes persistent memory 76, such as a hard disk drive or other suitable memory device, such writable CD, DVD, or tape drives.

Figure 2:
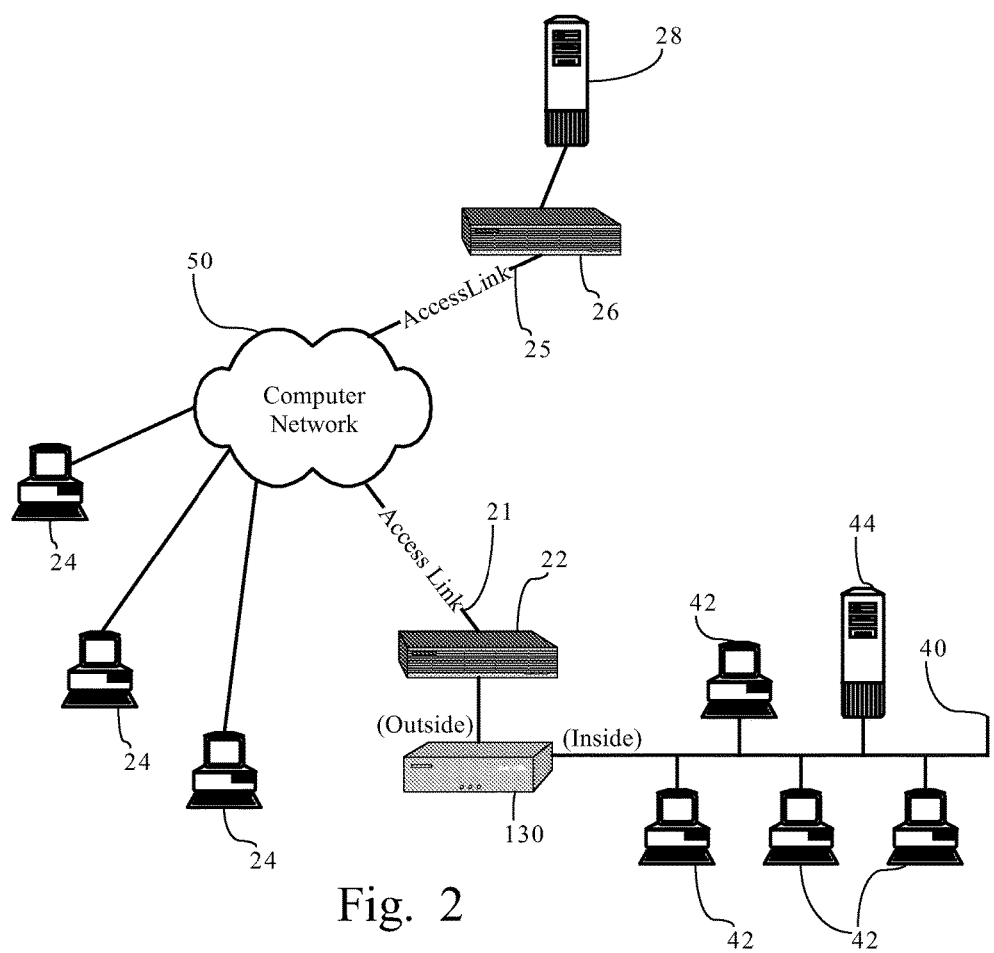
FIG. 2 is a functional block diagram illustrating a computer network environment including a bandwidth management device according to an embodiment of the present invention.

As FIGS. 1 and 2 show, the traffic monitoring device 30 (or bandwidth management device 130), in one embodiment, is disposed on the link between a local area network 40 and router 22. In other embodiments, multiple traffic monitoring devices can be disposed at strategic points in a given network infrastructure to achieve various objectives. In addition, traffic monitoring device 30 need not be directly connected to the link between two network devices, but may also be connected to a mirror port. In addition, the traffic monitoring functionality described herein may be deployed in multiple network devices and used in redundant network topologies by integrating the network traffic synchronization functionality described in U.S. application Ser. No. 10/611,573, incorporated by reference above.

A. Network Traffic Monitoring and Enhanced Traffic Classification

As discussed herein, traffic monitoring device 30 is operative to detect or recognize flows between end systems or hosts, and classify the data flows based on one or more flow and/or behavioral attributes. Traffic monitoring device 30 may also monitor and store one or more measurement variables on an aggregate and/or per-traffic-class basis.

Figure 4:
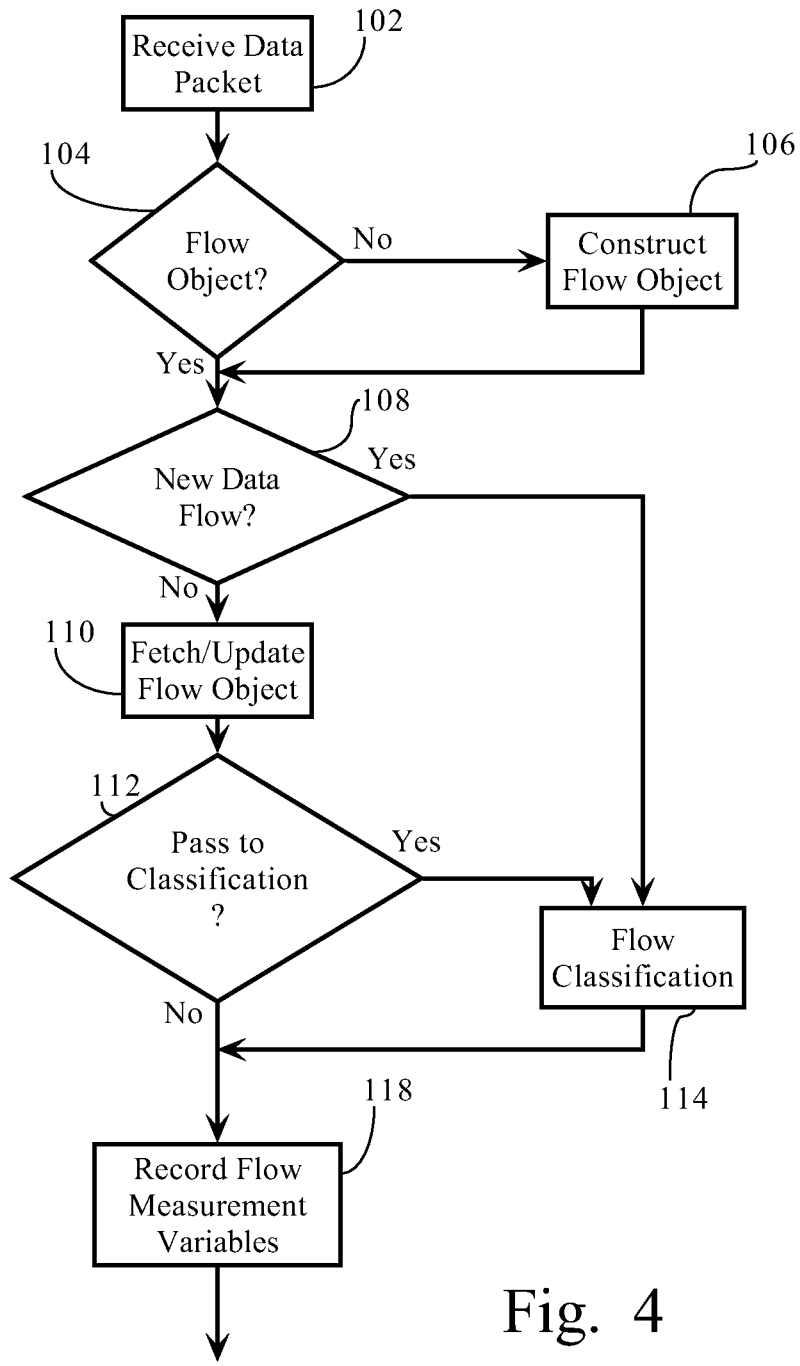
FIG. 4 is a flow chart diagram providing a method, according to an embodiment of the present invention, directed to the processing of packets in a traffic monitoring device.

FIG. 4 illustrates a method, according to an embodiment of the present invention, directed to a flow-aware process that classifies flows and maintains one or more measurement variables based on the identified traffic class. As FIG. 4 illustrates, a packet processor 82 receives a data packet (102) and determines whether a flow object has already been created for the flow to which the data packet is a part (104). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (106). Packet processor 82 then determines whether the received packet is part of an existing flow or a new data flow (108). In one embodiment, flows are generally TCP and UDP flows. However, any suitable transport layer flow can be recognized and detected. In one embodiment, packets and their respective flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (110). For example, the packet processor 82, in one embodiment, increments the packet count associated with the flow. If the packet represents a new data flow, traffic classification engine 86 operates on the flow object and, potentially, attributes of the packet and other packets associated with the flow to determine a traffic type and/or traffic class associated with the flow (112, 114). In one embodiment, the packet (or a pointer to the packet stored in a buffer structure) and the flow object (or a pointer thereto) is passed to the traffic classification engine 86 to determine a traffic class. As discussed in more detail below, identification of a traffic class or type can employ information gleaned from Layers 2 thru 7 of the OSI reference model. The determination of traffic classes is discussed in more detail below at Sections B.1. and B.3. Packet processor 82 or another module then records or updates various measurement variables, such as packet count, byte count, last packet time and the like (118). As discussed above, traffic monitoring device 30 may perform other operations, such as firewall or gateway operations, packet capture operations, and/or bandwidth management functions.

A.1. Traffic Classification

Traffic classification engine 86, in one implementation, is operative to classify data flows on two different frameworks. That is, traffic classification engine 86 is operative to classify traffic, according to a first framework, based on explicitly-presented attributes of individual packets of the data flows such as IP address, port numbers, protocol identifiers and the like. The classification frameworks can operate concurrently relative to a given data flow or alternatively. For example, the second framework can be applied only after the first framework fails to classify the traffic. In other implementations, the results of the first framework can be validated by the results of the second framework and vice versa. In other implementations, the results of the first and second frameworks can be consulted to make a final classification decision about a given traffic flow.

According to this first framework, a traffic class has at least one attribute defining the criterion(ia) against which data flow attributes are analyzed for the purpose of determining a matching traffic class. For example, a traffic class can be defined by configuring an attribute defining a particular well-known port number in combination with other attributes. Of course, a particular traffic class can be defined in relation to a variety of related and/or orthogonal data flow attributes. U.S. Pat. No. 6,412,000 and U.S. patent application Ser. No. 10/039,992 describe some of the data flow attributes that may be used to define a traffic class, as well as the use of hierarchical classification structures to associate traffic classes to data flows. In one embodiment, traffic classification engine 86 includes functionality allowing for classification of network traffic based on information from layers 2 to 7 of the OSI reference model. Traffic classification engine 86, in one embodiment, stores the traffic classes and corresponding data (e.g., matching rules, policies, etc.)

related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. In one embodiment, the root traffic classifications are "/inbound/" and "/outbound/" data flows. As discussed in U.S. application Ser. No. 10/334,467, traffic classification engine 86, in one implementation, is configured to traverse the hierarchical traffic classification tree, applying the matching rules associated with each traffic class node, in the order in which they are configured. In one embodiment, traffic classification engine 86 attempts to match to a leaf traffic class node before proceeding to remaining traffic class nodes in the hierarchical configuration. If a traffic class is found, the traffic classification database 137 stops the instant search process and returns the identified traffic classification. Any data flow not explicitly classified is classified as "/inbound/default/" or "/outbound/default/". Of course, one skilled in the art will recognize that alternative ways for traversing the hierarchical traffic class configuration can be implemented.

The second traffic classification framework involves the classification of data flows based on flow-based and/or host-based behaviors. As discussed below, behavioral classification can rely on or incorporate a number of the following functionalities.

Behavior Groups

In one implementation, the traffic classification mechanisms described herein, in addition to, or in lieu of, classifying data flows into specific network applications, can also classify data flows into behavior groups. Some behavior groups are based on flow-based behaviors, while other behavior groups are based on host-based behaviors. The following sets forth a list of behavior groups, each of which include classification rules that assess the way a flow or host behaves to make a determination that a given flow behaves "like" or at least similar to a given kind of network application, such as a VoIP call or a HTML/HTTP browsing session.

Flow-Based Behavior Groups can include: 1) Interactish; 2) Voipish; 3) Keepalivish; 4) VideoStreamish; 5) FileTransferish; and 6) Multicastish. Host-based Behavior Groups can include: 1) P2Pish; and 2) Serverish. In some implementations, identification of a flow-based behavior group may require assessment of at least N packets (e.g. N=5) to adequately assess a behavior. In contrast, most host-based behavior groups can be identified based on the first packet of the data flow, because the classification is made largely on the previously observed behavior of the host, as opposed to the current flow or the packet of the flow.

Predictive Host Index Values

In one implementation, traffic monitoring device 30 maintains various behavioral index values for one or more hosts identified in the network traffic data flows. In one implementation, the behavioral index values include a port diversity index, a peer diversity index and a behavior index. The port diversity index is a value indicating the probability that a given host maintains connections with a relatively high number of different ports. For example, a typical host utilizes a relatively small number of ports (e.g., port 80, 8080 for HTTP, as well as other well-known port numbers), whereas a host running a P2P application (e.g., file sharing/VoIP, etc.) may utilize a larger number of ports. The peer diversity index indicates a probability that a first host connects to a relatively high number of different hosts. The behavior index indicates the relative quality of the active applications running on a given host.

Packet processor 82, in one implementation, maintains certain data in host database 134 that support the behavior classification operations described herein. FIG. 5 illustrates the data flow metrics maintained in host database 134, according to an embodiment of the present invention. As FIG. 5 illustrates, packet processor 82, in one embodiment, maintains, inter alia, for each IP address 1) the number of concurrent connections (Conn); 2) the current data flow rate (Curr rate); and 3) the average bits per second (bps) over a one minute interval (1 Min avg). In addition, in one implementation, host database 134 maintains for each host address the following fields: 4) the number of new flows or connections for which the host is a client over the last minute; 5) the number of new flows or connections for which the host is a server over the last minute; and 6) the number of failed flows corresponding to a given host. In some implementations, host database 134 may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. As discussed above, packet processor 82 is operative to identify new data flows, as well as the termination of existing data flows, and updates the statistics identified above as data flows traverse network device. As discussed below, traffic classification engine 86, in one implementation, is operative to access these values, as well as other data structures (e.g., flow database 135) to classify a data flow. In one embodiment, a process executing in the packet processing path, for example, can collect the raw data at periodic intervals for subsequent evaluation by other processes or modules, such as traffic classification engine 86.

The following code segments illustrate how various indexes and supporting metrics are maintained. For example, in one implementation, a port diversity index can be maintained by tracking the N (e.g., N=5) most recently detected server port numbers associated with a given host. As new data flows of the host are detected, the server port is compared to the list of N port numbers. If the server port number is new (relative to the list), then the port diversity index may be increased and the new port number is added to the list, replacing the oldest entry in the list. If the server port number is on the list, the port diversity index is decremented. The following code segment illustrates how the port diversity index may be adjusted. The same logic can be utilized for updating Peers/hosts, applications, etc.

```
inline void
BehaviorHostTraits::UpdateTopPorts(IpPort port)
{
// kMaxBehaviorRecords is 5
for (int idx = 0; idx < kMaxBehaviorRecords; idx++) {
// Found matching port
if (ports__[idx].value == port) {
ports__[idx].hits++;
ports__[idx].createTime.Reset( );
return;
}
// Found an empty record. Assign this port there
else if (ports__[idx].value == 0) {
ports__[idx].value = port;
ports__[idx].createTime.Reset( );
ports__[idx].hits = 0;
UpdateDiversityIndex(portDiversityIndex__, true); // Increase diversity
return;
```

```
}
}
UpdateDiversityIndex(portDiversityIndex_, false); // decrease diversity
ports_->UpdateBehavior(port);
}
```

The following function is called to update the most recent 5 server side ports or hosts (IP Addresses) with current flow's server side host IP & port number. These are used for calculating port & peer diversity indices for each of the hosts.

```
template <typename T>
ItemCount
BehaviorTraitRecord<T>::UpdateBehavior(T &newValue)
{
// Replace old entry with new one
ItemCount minHits = 0x7FFFFFFF;
AbsTime lruTime;
ItemCount replaceIndex = 0;
AbsTime now;
// Record update strategy in the following order:
// - Pick the record that has stale info -- means exceeded max idle time
// - Pick the record with least number of hits
// - if all records have same number of hits, then pick the record based on LRU value
for (ItemCount idx = 0; idx < kMaxBehaviorRecords; idx++) {
// Reset hit count for the stale record, every thing else is taken care of automatically
if (SecondTimeInterval(now.GetTimeSince(this[idx].createTime)).Get_value( ) >=
kMaxRecordIdleTime) {
minHits = 0;
}
if (this[idx].hits < minHits ||
(this[idx].hits == minHits &&
this[idx].createTime < lruTime)) {
minHits = this[idx].hits;
lruTime = this[idx].createTime;
replaceIndex = idx;
}
}
// Insert the new value at this location
this[replaceIndex].value = newValue;
this[replaceIndex].createTime.Reset( );
this[replaceIndex].hits = 0;
return replaceIndex;
}
```

When a new data flow is seen by traffic monitoring device 30, it updates the port diversity index using the following function. If the port is present in the cached records then the diversity index is decremented, otherwise it is incremented. The same logic can be applied to the host/peer diversity index.

```
inline void
BehaviorHostTraits::UpdateDiversityIndex(ItemCount &diversityIndex,
bool isMatched)
{
if (isMatched) {
diversityIndex -= 1;
}
else {
diversityIndex += 1;
}
if (diversityIndex > 100) {
diversityIndex = 100;
}
else if (diversityIndex < 0) {
diversityIndex = 0;
}
}
```

In one implementation, network monitoring device 130 determines a Behavior Index based on a Penalty Index (e.g., a Penalty index is inversely related to the Behavior Index) for a given host. The Behavior Index indicates a quality of the applications executing on a given host. For example, a host running a P2P application may be associated with a certain Behavior Index value, while a host running only business applications may be associated with a better Behavior Index value. Each service-based classification that is based on explicitly presented attributes of the data flows has service type associated with it (e.g. VoIP, Video, P2P, etc). Each service type has a fixed penalty value. When network monitoring device 30 classifies a data flow, it looks up the penalty value for that flow and calculates a new Behavior Index by adding the corresponding penalty value to the Behavior Index associated with that host. Penalty Index is inversely related to Behavior Index. So, for example, Behaviorindex=(100−PenaltyIndex).

Some service types have a positive penalty value, while others have a negative value. In an alternative embodiment, the penalty values can be derived from a profile, which can vary based on different goals of users, or by particular servers or hosts within an enterprise. For example, within a video hosting/streaming service or a content hosting site, types of network traffic having a Streaming behavior can be considered Important.

The following function returns a penalty value for a data flow.

```
PenaltyIndex::PenaltyValue
PenaltyIndex::GetPenaltyValue(const ServiceId &sid) {
    ServiceId::IdValue typeVal = sid.GetServiceType( );
    switch(typeVal) {
    case ServiceType::eTypeMissionCritical:
    case ServiceType::eTypeImportant:
```

```
case ServiceType::eTypeCommerce:
case ServiceType::eTypeIgnore:
    // Penalty value −3
    return ePenaltyLowest;
case ServiceType::eTypeControl:
case ServiceType::eTypeNetManagement:
case ServiceType::eTypeVoice:
case ServiceType::eTypeVideo:
case ServiceType::eTypeLegacy:
    // Penalty value −2
    return ePenaltyLow;
case ServiceType::eTypeInteractive:
case ServiceType::eTypeShortFlow:
    // Penalty value −1
    return ePenaltyMedLow;
case ServiceType::eTypeNonInteractive:
case ServiceType::eTypeTunneling:
    // Penalty value 0
    return ePenaltyMedium;
case ServiceType::eTypeFileServer:
case ServiceType::eTypeStreaming:
    // Penalty value 1
    return ePenaltyMedHigh;
case ServiceType::eTypeGame:
case ServiceType::eTypeOverhead:
    // Penalty value 2
    return ePenaltyHigh;
case ServiceType::eTypePest:
case ServiceType::eTypeDangerous:
    // Penalty value 3
    return ePenaltyExtreme;
default:
    return ePenaltyMedium;
}
```

The following function updates the Penalty Index for each host. In one implementation, network monitoring device 30 calculates a Penalty Index for both source and destination hosts of a data flow.

```
inline void
BehaviorHostTraits::UpdatePenaltyIndex(PenaltyIndex::PenaltyValue
value, Direction dir) {
    assert(dir < eMaxDirections);
    penaltyIndex__[dir] += value;
    if (penaltyIndex__[dir] > 100) {
        penaltyIndex__[dir] = 100;
    }
    else if (penaltyIndex__[dir] < 0) {
        penaltyIndex__[dir] = 0;
    }
}
```

In some implementations, as a packet of a flow arrives, it is passed to one or more behavior classification modules directed to the behavior groups identified above. In one implementation, the packets are first passed to flow-based classification modules for possible classification, over host-based classification modules. The following code segment illustrates how a packet is passed to various behavior classification modules.

```
Status
BehaviorClassifyMgr::ClassifyFlow(Packet *pPkt, BehaviorHostTraits*& pInitiatorInfo,
BehaviorHostTraits*& pAcceptorInfo,
BehaviorFlowTraits*& pFlowInfo)
{
BehaviorIdMgr::ClassifyStatus status = BehaviorIdMgr::eBehaviorUnknown;
///////////////// FLOW BASED BEHAVIOR CLASSIFICATION /////////////////
// NOTE: Flow based behavior identification is classified first.
// Also we only identify single behavior per flow.
status = pCaster__->ClassifyTraffic(pPkt, pInitiatorInfo, pAcceptorInfo, pFlowInfo);
if (status == BehaviorIdMgr::eBehaviorUnknown) {
status = pVoiper__->ClassifyTraffic(pPkt, pInitiatorInfo, pAcceptorInfo,
pFlowInfo);
}
if (status == BehaviorIdMgr::eBehaviorUnknown) {
status = pVStreamer__->ClassifyTraffic(pPkt, pInitiatorInfo, pAcceptorInfo,
pFlowInfo);
}
if (status == BehaviorIdMgr::eBehaviorUnknown) {
status = pInteracter__->ClassifyTraffic(pPkt, pInitiatorInfo, pAcceptorInfo,
pFlowInfo);
}
if (status == BehaviorIdMgr::eBehaviorUnknown) {
status = pFileXferer__->ClassifyTraffic(pPkt, pInitiatorInfo, pAcceptorInfo,
pFlowInfo);
}
///////////////// HOST BASED BEHAVIOR CLASSIFICATION /////////////////
if (status == BehaviorIdMgr::eBehaviorUnknown) {
status = pServer__->ClassifyTraffic(pPkt, pInitiatorInfo, pAcceptorInfo,
pFlowInfo);
}
if (status == BehaviorIdMgr::eBehaviorUnknown) {
status = pP2per__->ClassifyTraffic(pPkt, pInitiatorInfo, pAcceptorInfo,
pFlowInfo);
}
return kNoError;
}
```

The following is a code segment that illustrates operation of an example VoIP Behavior Classification module.

```
BehaviorIdMgr::ClassifyStatus
Voipish::ClassifyTraffic(Packet *pPkt, BehaviorHostTraits*& pInitiatorInfo,
BehaviorHostTraits*& pAcceptorInfo,
BehaviorFlowTraits*& pFlowInfo)
{
UINT64 initiatorPktGap =
pFlowInfo->GetInterPktGapMsec(BehaviorFlowTraits::eDirFromInitiator);
UINT64 acceptorPktGap =
pFlowInfo->GetInterPktGapMsec(BehaviorFlowTraits::eDirFromAcceptor);
if (pFlowInfo->GetPktCount(BehaviorFlowTraits::eDirFromInitiator) > 10 &&
initiatorPktGap > 0 &&
acceptorPktGap > 0 &&
initiatorPktGap < 100 &&
acceptorPktGap < 100) {
ItemCount initiatorDataLen =
pFlowInfo->GetAvgDataLen(BehaviorFlowTraits::eDirFromInitiator);
ItemCount acceptorDataLen =
pFlowInfo->GetAvgDataLen(BehaviorFlowTraits::eDirFromAcceptor);
ItemCount dataLenDiff =
(initiatorDataLen > acceptorDataLen)?(initiatorDataLen-acceptorDataLen):
(acceptorDataLen-initiatorDataLen);
// Check the data lengths
if (((pInitiatorInfo->GetAvgDataLen(BehaviorHostTraits::eDirToHost) < 150 &&
pInitiatorInfo->GetAvgDataLen(BehaviorHostTraits::eDirFromHost) < 150) ||
(pAcceptorInfo->GetAvgDataLen(BehaviorHostTraits::eDirToHost) < 150 &&
pAcceptorInfo->GetAvgDataLen(BehaviorHostTraits::eDirFromHost) < 150)) &&
// Packets can not be very small
initiatorDataLen > 30 &&
acceptorDataLen > 30 &&
// VOIP uses constant bit rate (CBR), data length deviation should be small
pFlowInfo->GetDataLenStd(BehaviorFlowTraits::eDirFromInitiator) < 50 &&
pFlowInfo->GetDataLenStd(BehaviorFlowTraits::eDirFromAcceptor) < 50 &&
// Uses same codecs on both the directions after negotiation, data length
// should not be much different in both the directions
dataLenDiff < 0.1 * initiatorDataLen) {
pIdMgr_->AddBehavior(pPkt, myBehaviorId_);
std::cout << "VOIP Traffic"<< std::endl;
return BehaviorIdMgr::eBehaviorIdentified;
}
}
return BehaviorIdMgr::eBehaviorUnknown;
}
```

As the foregoing illustrates, the VoIP behavior classification module considers, among others, the timing between packets of the data flow and the sizes of the packets to determine whether the hosts appear to be executing a codec that typically sends packets of substantially the same length at regular intervals. The VoIP behavior classification module also considers the different between the amount of data sent and received on the data flow connection by the host to verify that the host appears to behave like a VoIP peer that receives approximately the same amount of data that it sends.

The following is a code segment that illustrates operation of an example P2P Behavior Classification module.

```
BehaviorIdMgr::ClassifyStatus
P2pish::ClassifyTraffic(Packet *pPkt, BehaviorHostTraits*&
pInitiatorInfo,
BehaviorHostTraits*& ,
BehaviorFlowTraits*& pFlowInfo)
{
// Check data pkt count in both the directions
ItemCount initiatorPktCount =
pFlowInfo->GetPktCount(BehaviorFlowTraits::eDirFromInitiator);
// Large number of data pkts from acceptor
if (initiatorPktCount > 3 &&
pInitiatorInfo->GetFlowRate(BehaviorHostTraits::eDirFromHost) > 5 &&
pInitiatorInfo->GetPeerDiversityIndex( ) > 25) {
pIdMgr_->AddBehavior(pPkt, myBehaviorId_);
std::cout << " P2P Traffic"<< std::endl;
return BehaviorIdMgr::eBehaviorIdentified;
}
return BehaviorIdMgr::eBehaviorUnknown;
}
```

The behavioral classification functionality described herein can consult one or more of the peer diversity, port diversity and behavior indexes when deciding to classify a data flow based on behavioral attributes. As the foregoing illustrates, the P2P behavior classification module consults the peer diversity and behavior indexes as part of its decisional logic for determining whether a data flow should be classified as P2P traffic. In some implementations, the behavioral index can be considered as well. For example, a host with a poor behavior index value may be considered more likely to be running P2P software than a host associated with a better score.

In one implementation, traffic classification engine 86 applies the behavioral classification functionality described herein to data flows classified as /inbound/default/ or /outbound/default/. In other implementations, the traffic classification engine 86 can apply one or more behavioral classification modules concurrently with traditional classification modules. In some implementations, the results of behavioral classification can be utilized to decide on one or more policies to be applied to a data flow until it has been definitively classified (typically after encountering additional packets of the data flow).

In one implementation, the behavior classification functionality can also employ a selection of one to a combination of the following techniques:

1) Discoverable Protocol Type—In one implementation, discoverable attributes of the packets associated with a data flow are first used to identify or rule out possible applications or traffic classes. For example, that the data flow is a TCP flow or a UDP flow can be used to identify or rule out a pool of suspected applications or traffic classes.
2) Packet Size Matching—In one implementation, when studying the behavior of a given application it can sometimes be determined that the host application emits or receives data flows where the size of the packets exhibits a consistent pattern. For example, the peer-to-peer file sharing application, Winny, at startup attempts to discover one or more peers. This discovery process results in a plurality of data flows where the first packet is a given size, or at least within a narrow size range. The second and subsequent packets exhibit the same patterns as well. By observing this behavior, a knowledge base including these heuristic findings can be used to compile one or more application behavior pattern(s) for use in classifying data flows. For example, an application behavior pattern may specify the expected size of the first n (e.g., 3) packets in a data flow. To avoid the packet size pattern matching becoming immediately obsolete when new application releases introduced, minor size variations may be allowed when determining a matching pattern. In addition, as the following flow charts address, packets in a flow may arrive out of order at traffic monitoring device 30, implementations of the behavior pattern functionality adapt to these situations by looking to subsequent the packet sizes in the behavior pattern.
3) Entropy Calculation—The observed entropy of a data flow or portion thereof can also be used for traffic classification. An entropy value, in one implementation, is a parameter used to evaluate the information density of a file or chunk of binary data, such as a packet. A very high information density (e.g., an entropy value exceeding a threshold) can indicate that the information is essentially random or encrypted. Several well-known algorithms can be used to compute an entropy value for a given packet or group of packets, such as Entropy algorithm1, Chi-square Test2, Monte Carlo Value for Pi3, Arithmetic Mean4, and Serial Correlation Coefficient5. Of course, any suitable algorithm for computing the information density of a block of binary data can be used. As discussed below, in one implementation, the information density for the first packet in the flow is analyzed. However, in other implementations, the information density of subsequent packets can be analyzed in addition to, or in lieu of, the first packet. Still further, the entropy value computation may be a composite value or set of values, resulting from the application of a plurality of algorithms. For example, the application behavior pattern may include entropy values or ranges for two different algorithms, since the algorithms are unique and will produce different values. Accordingly, a data flow can be classified, at least in part, by how closely one or more packets track the values in the application behavior pattern. Still further, the entropy value can be computed with respect to portions of individual packets, such as the first n bytes.
4) Inter flow Timing—The timing between a current flow and a previous flow, both associated with a given host can also be used to classify the current flow. For example, a Winny peer at start up typically attempts to discover multiple peers, resulting in multiple data flows spaced closely in time. Accordingly, if the interval between a current flow and a previous flow suspected as Winny traffic exceeds a maximum interval time, these two flows will not be deemed concurrent or part of the same application traffic.
5) Related Flow Characterization—In one implementation, the number of related data flows associated with a suspected application can also be used in behavior pattern matching. In one implementation, a minimum number of suspected application flows must be encountered before traffic classification engine 86 decides to classify the otherwise unknown flows as the suspected application. In one implementation, traffic classification engine 86 keeps track of the total number of suspected application flows associated with a given host. While keeping track of this number, traffic classification engine 86 resets this total if the 'inter flow timing' (above) exceeds the limit associated with the behavior pattern of the suspected application.

Of course, other factors can be considered as well. For example, the application behavior may include required time values or ranges for the timing between packets in a given flow. Still further, the entropy computation discussed above can be applied to an entire data flow, or in the aggregate, to a group of related flows. In addition, the application behavior may specify size requirements for a group of related data flows. For example, an application behavior may specify a first size range (e.g., in bytes) for a first suspected application flow, and a second size range for a second related flow, and so on. Still further, the application behavior may include a specification of the sequence, direction, and/or timing of various protocol identifiers or flags. For example, an application behavior pattern may include a sequence and timing specification of certain TCP flags (such as SYNs, ACKs, FINs, RSTs, etc.) that should be encountered during a data flow or sequence of data flows in order to match a suspected traffic class.

In one implementation, the IP address of the host is used to identify the host of interest. The host can either be the source or destination host depending on the suspected application type and the type of activity after which the pattern is modeled.

B. Integration of Behavior Pattern Matching into Bandwidth Management Devices

As discussed above, the enhanced traffic classification functionality described above, in one embodiment, can be integrated into a bandwidth management device 130 operative to manage data flows traversing access link 21. FIG. 2 sets forth a packet-based computer network environment including a bandwidth management device 130. As FIG. 2 shows, local area computer network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and local area network 40. Server 28 is a TCP end system connected to computer network 50 through router 26 and access link 25. Client devices 24 are additional TCP end systems operably connected to computer network 50 by any suitable means, such as through an Internet Services Provider (ISP). The computer network environment, including computer network 50 is a packet-based communications environment, employing TCP/IP protocols, and/or other suitable protocols, and has a plurality of interconnected digital packet transmission stations or routing nodes. Bandwidth management device 130 is provided between router 22 and local area computer network 40. Bandwidth management device 130 is operative to classify data flows and, depending on the classification, enforce respective bandwidth utilization controls on the data flows to control bandwidth utilization across and optimize network application performance across access link 21.

Figure 3:
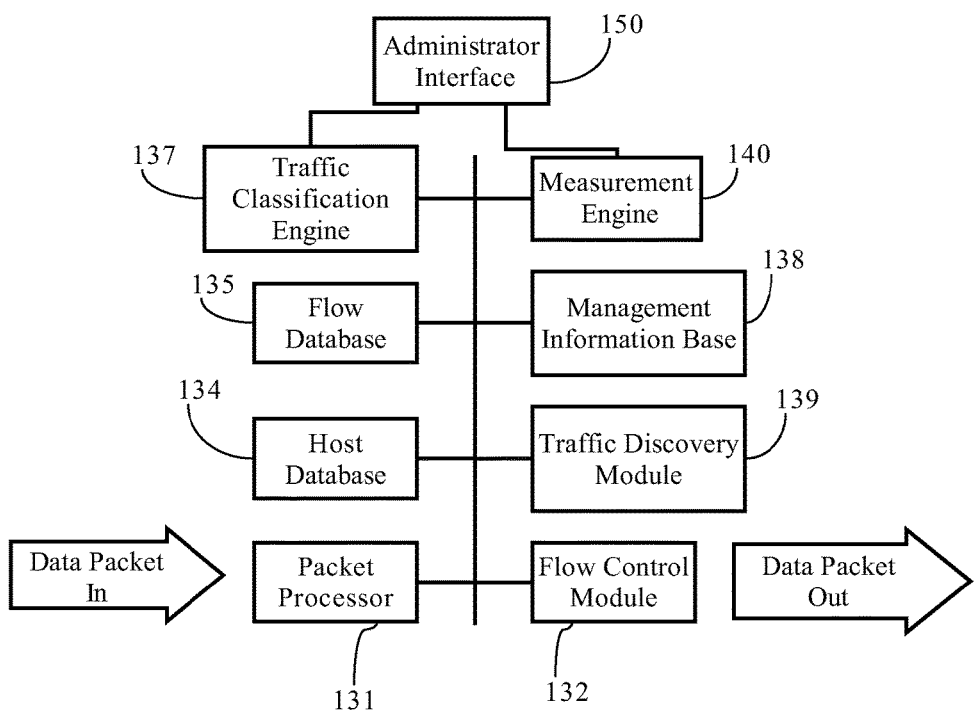
FIG. 3 is a functional block diagram setting forth the functionality in a bandwidth management device according to an embodiment of the present invention.

FIG. 3 is a block diagram illustrating functionality, according to one embodiment of the present invention, included in bandwidth management device 130. In one embodiment, bandwidth management device 130 comprises packet processor 131, flow control module 132, measurement engine 140, traffic classification engine 137, management information base (MIB) 138, traffic discovery module 139, and administrator interface 150. Packet processor 131 is operative to detect new data flows and construct data structures including attributes characterizing the data flow. Flow control module 132 is operative to enforce bandwidth utilization controls on data flows traversing bandwidth management device 130. Traffic classification engine 137 is operative to analyze data flow attributes and identify traffic classes corresponding to the data flows, as discussed more fully below. In one embodiment, traffic classification engine 137, in one implementation, stores traffic classes associated with data flows encountered during operation of bandwidth management device 130, as well as manually created traffic classes and a hierarchical traffic class structure, if any, configured by a network administrator. In one embodiment, traffic classification engine 137 stores traffic classes, in association with pointers to bandwidth utilization controls or pointers to data structures defining such bandwidth utilization controls. Management information base 138 is a database of standard and extended network objects related to the operation of bandwidth management device 130. Traffic discovery module 139 is operative to automatically discover traffic classes based on examination of one or more attributes of the data flows traversing bandwidth management device 130. Measurement engine 140 maintains measurement data relating to operation of bandwidth management device 130 to allow for monitoring of bandwidth utilization across access link 21 with respect to a plurality of bandwidth utilization and other network statistics on an aggregate and/or per-traffic-class level. Bandwidth management device 130, in one embodiment, further includes a persistent data store (not shown), such as a hard disk drive, for non-volatile storage of data.

Administrator interface 150 facilitates the configuration of bandwidth management device 130 to adjust or change operational and configuration parameters associated with the device. For example, administrator interface 150 allows administrators to select identified traffic classes and associate them with bandwidth utilization controls (e.g., a partition, a policy, etc.). Administrator interface 150 also displays various views associated with a hierarchical traffic classification scheme and allows administrators to configure or revise the hierarchical traffic classification scheme. Administrator interface 150 also allows a network administrator to view and configure one or more parameters associated with the behavior classification functionality described herein. Administrator interface 150 can be a command line interface or a graphical user interface accessible, for example, through a conventional browser on client device 42.

B.1. Packet Processing

In one embodiment, when packet processor 131 encounters a new data flow it stores the source and destination IP addresses contained in the packet headers in host database 134. Packet processor 131 further constructs a control block (flow) object including attributes characterizing a specific flow between two end systems. In one embodiment, packet processor 131 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 131, in one embodiment, reserves memory space in the dynamic memory pool for storing such variably-sized attribute information as flows traverse bandwidth management device 130. Packet processor 131 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2 illustrates the concept associated with inside and outside addresses. As discussed above, in one embodiment, a flow specification object includes an "inside" and "outside" address relative to bandwidth management device 130. See FIG. 2. For a TCP/IP packet, packet processor 131 can compute the inside and outside addresses based on the source and destination addresses of the packet and the direction of the packet flow.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow. As discussed above, in one embodiment, the control block object attributes further include a packet count corresponding to the number of packets associated with the flow to allow for such operations as the application of policies based on packet counts.

To allow for identification of service types (e.g., FTP, HTTP, etc.), packet processor 131, in one embodiment, is supported by one to a plurality of service identification tables in a relational database that allow for identification of a particular service type (e.g., application, protocol, etc.) based on the attributes of a particular data flow. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 130 encounters a new flow, packet processor 131 analyzes the data flow against the service attributes in the services table to identify a service ID corresponding to the flow. In one embodiment, packet processor 131 may identify more than one service ID associated with the flow. In this instance, packet processor 131 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor associates the flow with the most specific service ID. A traffic class may be configured to include matching rules based on the service IDs in the services table. For example, a matching rule directed to HTTP traffic may simply refer to the corresponding service ID, as opposed to the individual attributes that packet processor 131 uses to initially identify the service.

In one embodiment, when packet processor 131 inspects a flow it may detect information relating to a second, subsequent flow (e.g., an initial FTP command connection being the harbinger of a subsequent data connection, etc.). Packet processor 131, in response to such flows populates a remembrance table with attributes gleaned from the first flow, such as IP addresses of the connection end points, port numbers, and the like. Packet processor 131 scans attributes of subsequent flows against the remembrance table to potentially associate the subsequent flow with the first flow and to assist in identification of the second flow.

B.2. Flow Control Module

As discussed above, flow control module 132 enforces bandwidth utilization controls (and, in some embodiments, other policies) on data flows traversing access link 21. A bandwidth utilization control for a particular data flow can comprise an aggregate control bandwidth utilization control, a per-flow bandwidth utilization control, or a combination of the two. Flow control module 132 can use any suitable functionality to enforce bandwidth utilization controls known in the art, including, but not limited to weighted fair queuing, class-based weighted fair queuing, Committed Access Rate (CAR) and "leaky bucket" techniques. Flow control module 132 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention.

B.2.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

B.2.b. Per-Flow Bandwidth Utilization Controls

Flow control module 132 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 132 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class. Other policy types include redirection policies where an inbound request designating a particular resource, for example, is redirected to another server.

B.3. Traffic Classification

A traffic class comprises a set of matching rules or attributes allowing for logical grouping of data flows that share the same characteristic or set of characteristics—e.g., a service ID or type (see Section B.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, bandwidth management device 130 includes functionality allowing for classification of network traffic based on information from layers 2 to 7 of the OSI reference model.

In one implementation, bandwidth management device 130 allows a network administrator to select from a set of pre-configured traffic classes corresponding to known network applications and add them to the configuration of traffic classification engine 137. Bandwidth management device 130, in one embodiment, allows an administrator to manually create a traffic class by specifying a set of matching attributes. Administrator interface 150, in one embodiment, allows for selection of a traffic class and the configuration of bandwidth utilization (e.g., partition, policy, etc.) and/or other controls/policies (e.g., redirection, security, access control, etc.) for the selected traffic class. Administrator interface 150, in one embodiment, also allows for the selection and arrangement of traffic classes into hierarchical reference trees. In one embodiment, traffic classification engine 137 also stores traffic classes added by traffic discovery module 139.

Traffic classification engine 137 stores traffic classes associated with data flows that traverse access link 21. Traffic classification engine 137, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Bandwidth management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 137 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3.a. Automatic Traffic Classification

As discussed above, traffic discovery module 139, in one implementation, analyzes data flows for which no matching traffic class was found in traffic classification engine 137. Traffic discovery module 139, in one embodiment, is operative to apply predefined sets of matching rules to identify a traffic class corresponding to non-matching data flows. In one implementation, traffic discovery module 139 operates on data flows classified as either /Inbound/Default or Outbound/Default. In one embodiment, traffic discovery module 139 is configured to include a predefined set of traffic classes based upon a knowledge base gleaned from observation of common or known traffic types on current networks. In one embodiment, traffic discovery module 139 creates traffic classes automatically in response to data flows traversing bandwidth management device 130 and stores such traffic classes in traffic classification engine 137. Automatic traffic classification is disclosed in U.S. Pat. Nos. 6,412,000, 6,457,051, and 6,591,299, which are incorporated herein by reference.

As discussed above, traffic discovery module 139 applies one or more traffic discovery thresholds when deciding whether to present or add newly discovered traffic classes. In one embodiment, traffic discovery module 139 must detect a minimum number of data flows within a predefined period for a given traffic type before it creates a traffic class in traffic classification engine 137. In one embodiment, such discovered traffic classes are, by default, attached to or associated with either the "/inbound/autodiscovered/" or "/outbound/autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined bandwidth utilization controls. U.S. patent application Ser. No. 09/198, 051, incorporated by reference herein, discloses automatic assignment of bandwidth utilization controls for discovered traffic classes. Furthermore, as discussed above, traffic discovery module 139 is operative to dynamically adjust one or more traffic discovery thresholds depending on at least one observed parameter or attribute, such as the rate of discovering new traffic classes relative to the number of data flows.

In one implementation, traffic discovery module 139 automatically adds newly discovered traffic classes to traffic classification engine 137, which are presented to the network administrator with manually configured and/or previously discovered traffic classes. In an alternative embodiment, traffic discovery module 139 may save the newly discovered traffic classes in a separate data structure and display them separately to a network administrator. The list may be sorted by any well-known criteria such as: 1) most "hits" during a recent interval, 2) most recently-seen (most recent time first), 3) most data transferred (bytes/second) during some interval, or a moving average. The user may choose an interval length or display cutoff point (how many items, how recent, at least B bytes per second, or other thresholds). The Network manager may then take some action (e.g. pushing a button) to select the traffic types she wishes to add to the classification tree.

B.3.b. Behavioral Traffic Classification

The behavioral classification functionality described above can be integrated into bandwidth management device 130 in a variety of ways. For example, in one implementation, the behavioral classification functionality can be implemented as an extension (e.g., provided by a plug-in, etc.) to traffic classification engine 137 in one to a plurality of subroutines. In another implementation, the behavioral classification functionality of the present invention may also be implemented as a separate software module.

Furthermore, as discussed above, the application behavior pattern matching functionality essentially classifies otherwise unknown traffic into one to a plurality of applications or traffic classes. In one implementation, a network administrator may explicitly add one or more of these traffic classes to the configuration of traffic classification engine 137, or similar to automatic traffic discovery, allow such traffic classes to be added to the configuration of traffic classification engine 137 when data flows associated with a given traffic class is encountered. In one implementation, traffic classes which use pattern matching are added at the end of the traffic classification configuration such that they are applied if no other traffic class is found to match the data flows. In addition, the pattern matching functionality can operate similarly to the traffic discovery module 139 by adding traffic classes to the configuration of traffic classification engine 137 upon detection of a sufficient number of data flows from a given host, and/or a threshold number of hosts. In another implementation, the pattern matching classification functionality is applied only if traffic discovery module 139 also fails to identify a traffic class. In another implementation, the enhanced behavior pattern matching functionality described herein can be applied only to data flows associated with suspicious activities, as disclosed in U.S. application Ser. No. 10/295,391. As the foregoing illustrates, one skilled in the art will recognize that a variety of configurations are possible with the various configurations presenting tradeoffs between each other.

B.4. Enforcement of Bandwidth Utilization Controls

Figure 7:
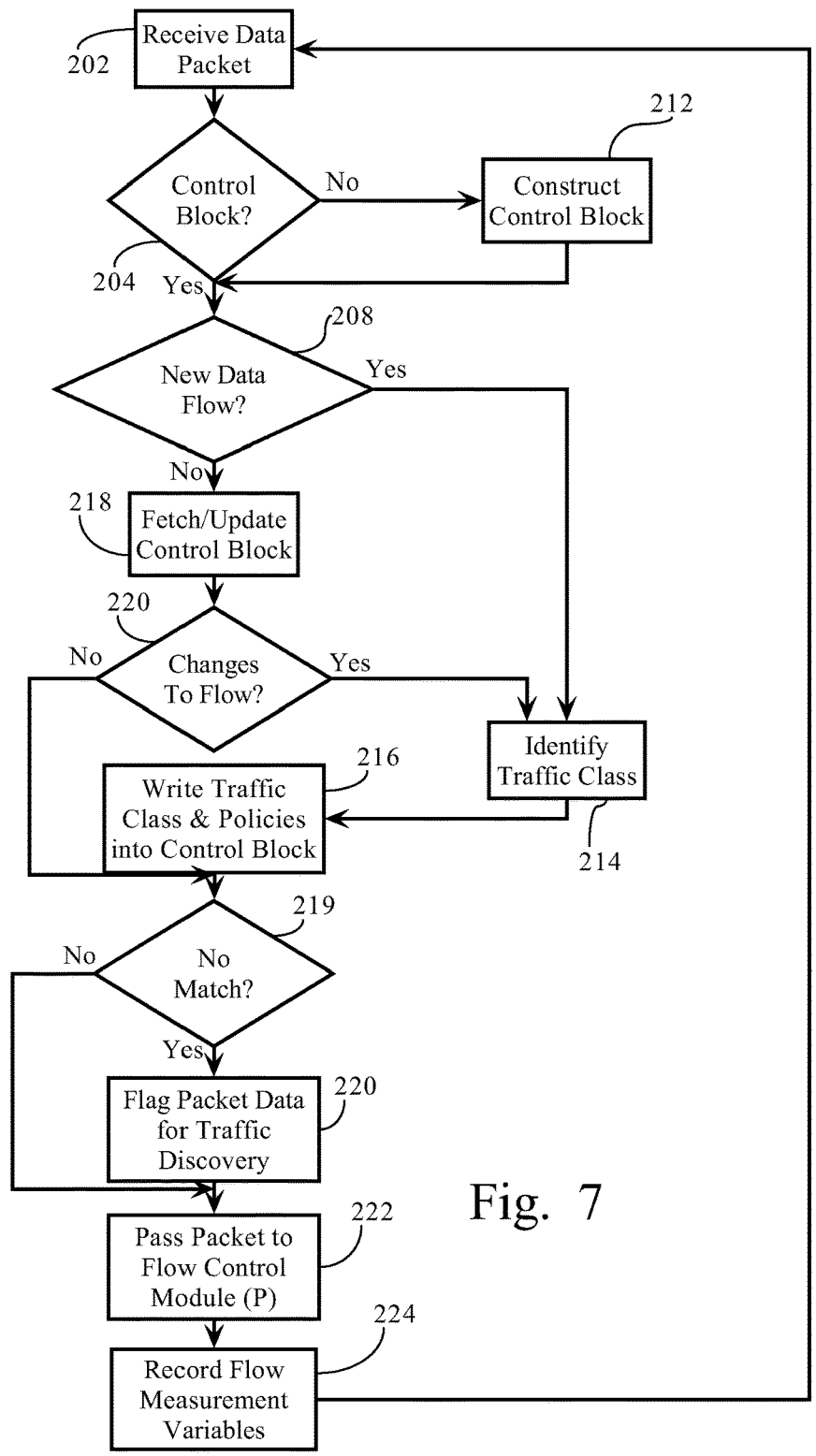
FIG. 7 is a flow chart diagram providing a method directed to enforcing bandwidth utilization controls on data flows.

FIG. 7 illustrates a method, according to one embodiment of the present invention, directed to the enforcement of bandwidth utilization controls on data flows transmitted across access link 21 and, therefore, traversing bandwidth management device 130. The method for enforcing bandwidth utilization controls, however, is not critical to the present invention; any suitable method can be employed.

In one embodiment, packet processor 131 receives a data packet (FIG. 7, 202) and determines whether flow database 135 contains an existing control block object corresponding to the data flow (204) (see Section B.1., supra). If no control block object corresponds to the data packet, packet processor 131 constructs a control block object including attributes characterizing the data flow, such as source address, destination address, service type, etc. (212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type, pointers to variable-length information in the dynamic memory pool, and other parameters characterizing the data flow.

If a control block object is found, as FIG. 7 illustrates, packet processor 131 then determines whether the received packet is part of a new data flow (208) or represents a change to an existing data flow (see 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In one embodiment, if the last packet time does exceed a threshold, this signals to the packet processor 131 that the previous flow has terminated, causing the packet processor 131 to notify FDR emitter 139. In another embodiment, a separate process monitors the last packet times associated with UDP, GRE and similar flow types to detect termination of a given flow. In some embodiments, packet processor 131 may have to encounter multiple packets to identify and fully characterize a new data flow (e.g., identify a service type, traffic class, etc.). For example, U.S. Pat. No. 6,046,980 and U.S. Pat. No. 6,591,299, identified above, discloses methods for classifying packet network flows.

If the data packet does not signify a new data flow, packet processor 131 retrieves the control block object, and associates the packet with the control block object (218). If elements of the data packet represent a change to the traffic type associated with the data flow (220), packet processor 131 passes the flow specification object to traffic classification engine 137 to identify a traffic class corresponding to the flow (214). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet, such as the detection of MIME types, etc.

As discussed above, to identify a traffic class associated with the data flow, packet processor 131 passes the control block object (or a pointer to the control block object) to traffic classification engine 137. In one embodiment, the control block object or a copy of it is stored in association with the packet and in the same buffer structure to facilitate access to the control block object by traffic classification engine 137. As discussed in more detail below, traffic classification engine 137 operates on attributes of the control block object and/or flow specification object, (and potentially on the packet stored in the buffer structure) to identify traffic class(es) associated with the data flow (214). In one embodiment, the control block object in flow database 135 includes a pointer to the identified traffic class(es) in traffic classification engine 137. In one embodiment, the traffic classification engine 137 stores in the control block object the policy parameters (e.g., bandwidth utilization control parameters, security policies, etc.) associated with the identified traffic classes (216). As discussed above, if the data flow does not match an existing traffic class (219), packet processor 82 or traffic classification engine 137 flags the packet for traffic discovery module 139 (220). In one embodiment, a data flow that does not match an existing traffic class is classified in the default traffic class. Traffic discovery module 139 operates on attributes of the data flow to classify it as discussed above. If the identified traffic class exceeds a discovery threshold, traffic discovery module 139, in one implementation, adds the discovered traffic class to traffic classification engine 137. In one implementation, traffic discovery module 139 also writes default bandwidth utilization controls and/or other policies (such as security or redirection policies) into traffic classification engine 137. In another embodiment, newly discovered traffic classes can be added to a separate list, or other data structure, from which a network administrator may elect to add to the traffic classification configuration maintained by traffic classification engine 137.

Packet processor 131 then passes the packet to rate control module 132 (222) which accesses the control block object corresponding to the data flow to retrieve the bandwidth utilization or other controls (e.g., partition, policy, security controls, etc.) associated with the traffic class and enforces the bandwidth utilization controls on the data packet flow. As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. As FIG. 7 illustrates, packet processor 131 also records or updates various measurement values in the control block object that characterize the flow (e.g., last packet time, packet count, byte count, etc.) (224). In addition, measurement engine 140, in one embodiment, records data associated with the packet to allow for analysis of bandwidth utilization and other network statistics on a traffic class, access link, and/or partition level.

C. Example Computing System Architectures

While the foregoing processes and mechanisms can be implemented by a wide variety of physical systems and in a wide variety of network environments, the network traffic classification systems described below provide example computing system architectures for didactic, rather than limiting, purposes.

Figure 6:
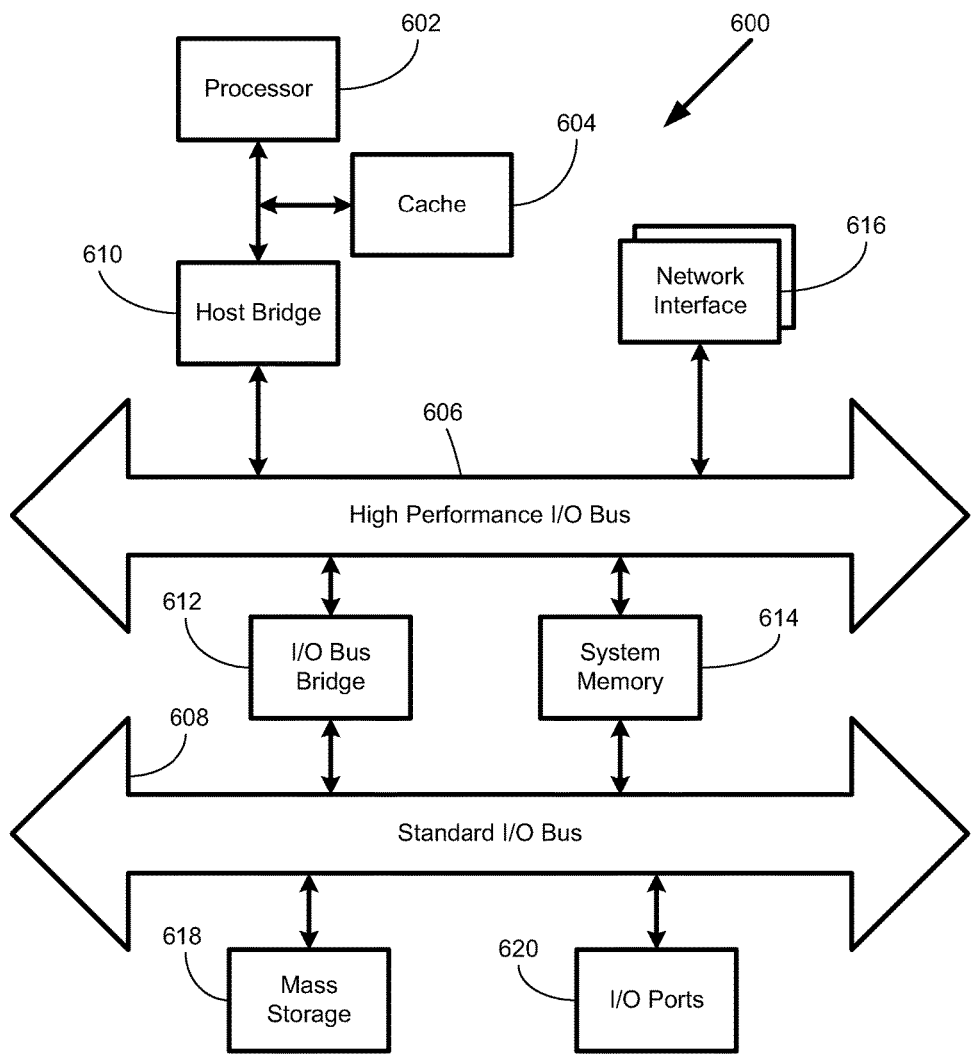
FIG. 6 is a functional block diagram illustrating an example network device hardware system architecture.

FIG. 6 illustrates an example computing system architecture, which may be used to implement a traffic classification device. In one embodiment, hardware system 600 comprises a processor 602, a cache memory 604, and one or more executable modules and drivers, stored on a computer readable medium, directed to the functions described herein. Additionally, hardware system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network/communication interfaces 616 couple to bus 606. Hardware system 600 may further include video memory (not shown) and a display device coupled to the video memory. Mass storage 618, and I/O ports 620 couple to bus 608. Hardware system 600 may optionally include a keyboard and pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, etc. Mass storage 618 provides permanent storage for the data and programming instructions to perform the above-described functions implemented in the cache or proxy 30, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures; and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present invention may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

As discussed below, in one implementation, the operations of one or more of the network traffic classification devices described herein are implemented as a series of executable modules run by hardware system 600. In a particular embodiment, a set of software modules or drivers implements a network communications protocol stack, including a link layer driver, a network layer driver, one or more transport layer modules (e.g., TCP, UDP, etc.), session layer modules, application layer modules and the like. The foregoing functional modules may be realized by hardware, executable modules stored on a computer readable medium, or a combination of both. For example, the functional modules may comprise a plurality or series of instructions to be executed by a processor in a hardware system, such as processor 602. Initially, the series of instructions may be stored on a storage device, such as mass storage 618. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 616. The instructions are copied from the storage device, such as mass storage 618, into memory 614 and then accessed and executed by processor 602.

An operating system manages and controls the operation of hardware system 600, including the input and output of data to and from software applications (not shown). The operating system provides an interface between the software applications being executed on the system and the hardware components of the system. Any suitable operating system may be used, such as the Windows Operating System offered by Microsoft Corporation, the Apple Macintosh Operating System, available from Apple Computer Inc. of Cupertino, Calif., UNIX operating systems, LINUX operating systems, BSD operating systems, and the like. Of course, other implementations are possible. For example, the classification functionalities described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be used in connection with application behavior patterns incorporating a variety of behavior attribute combinations described above. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method for facilitating classification of data flows, comprising:

monitoring data flows associated with hosts, wherein each data flow comprises a plurality of related packets;

determining at least one behavioral index value for each of the hosts based on observed behaviors of the hosts as expressed in at least one of the data flows, wherein the at least one behavioral index value comprises at least one of:

a port diversity index value that indicates a probability that a given host maintains connections with a larger quantity of different ports than a baseline host; and a peer diversity index value that indicates a probability that a first host connects to a higher number of different hosts than a baseline host;

classifying a first data flow for the first host based on the at least one behavioral index value for the first host;

identifying a new data flow associated with the first host;

in response to the new data flow, if the at least one behavioral index value for the first host comprises a first port diversity index value, updating the first port diversity index value, comprising:

comparing a server port number associated with the new data flow to a list of server port numbers associated with the first host, including determining whether the server port number is included or not included in the list of server port numbers;

responsive to determining that the server port number is not included in the list of server port numbers, incrementing the first port diversity index value for the first host;

responsive to determining that the server port number is included in the list of server port numbers, decrementing the first port diversity index value for the first host;

in response to the new data flow, if the at least one behavioral index value for the first host comprises a first peer diversity index value, updating the first peer diversity index value, comprising:

comparing a second host address associated with the new data flow to a list of host addresses associated with the first host, including determining whether the second host address is included or not included in the list of host addresses;

responsive to determining that the second host address is not included in the list of host addresses, incrementing the first peer diversity index value for the first host; and responsive to determining that the second host address is included in the list of host addresses, decrementing the first peer diversity index value for the first host;

updating the classification of the first data flow for the first host based on at least one of the updated first port diversity index value and the updated first peer diversity index value; and implementing a policy on the first data flow based on the updated classification of the first data flow, wherein implementing the policy comprises changing a configuration or operation of a first network device.

2. The method of claim 1 further comprising classifying one or more of the data flows into a behavior group of a plurality of behavioral groups based on respective behavioral index values associated with the data flows.

3. The method of claim 1 wherein the at least one behavioral index value for the first host comprises the port diversity index value.

4. The method of claim 1 further comprising:
replacing an oldest entry in the list of server port numbers with the server port number of the new data flow, when the server port number of the new data flow is not included in the list of server port numbers.

5. The method of claim 1 wherein the at least one behavioral index value for the first host comprises the peer diversity index value.

6. The method of claim 1 wherein the at least one behavioral index value comprises a host behavior index, and wherein the method further comprises:
classifying a third data flow associated with a third host into one of a predefined set of classifications; and
adjusting a behavioral index value for the third host associated with the third data flow based on the classification of the third data flow.

7. The method of claim 1 wherein the policy comprises at least one of:
bandwidth utilization control;
a partition;
a redirection policy; and
a security policy.

8. An apparatus comprising:
one or more network interfaces,
a memory;
one or more processors;
a behavioral traffic classification module comprising computer-executable instructions stored on a computer readable medium, the instructions readable by the one or more processors, the instructions, when read and executed, for causing the one or more processors to:
monitor data flows associated with hosts, wherein each data flow comprises a plurality of related packets;
determine at least one behavioral index value for each of the hosts based on observed behaviors of the hosts as expressed in at least one of the data flows, wherein the at least one behavioral index value comprises at least one of:
a port diversity index value that indicates a probability that a given host maintains connections with a larger quantity of different ports than a baseline host; and
a peer diversity index value that indicates a probability that a first host connects to a higher number of different hosts than a baseline host;
classify a first data flow for the first host based on the at least one behavioral index value for the first host;
identify a new data flow associated with the first host;
in response to the new data flow, if the at least one behavioral index value for the first host comprises a first port diversity index value, update the first port diversity index value, comprising:
compare a server port number associated with the new data flow to a list of server port numbers associated with the first host, including instructions to determine whether the server port number is included or not included in the list of server port numbers;
responsive to the instructions to determine that the server port number is not included in the list of server port numbers, increment the first port diversity index value for the first host;
responsive to the instructions to determine that the first server port number is included in the list of server port numbers, decrement the first port diversity index value for the first host;
in response to the new data flow, if the at least one behavioral index value for the first host comprises a first peer diversity index value, update the first peer diversity index value, comprising:
compare a second host address associated with the new data flow to a list of host addresses associated with the first host, including instructions to determine whether the second host address is included or not included in the list of host addresses;
responsive to the instructions to determine that the second host address is not included in the list of host addresses, increment the first peer diversity index value for the first host; and
responsive to the instructions to determine that the second host address is included in the list of host addresses, decrement the first peer diversity index value for the first host;
update the classification of the first data flow for the first host based on at least one of the updated first port diversity index value and the updated first peer diversity index value; and
implement a policy on the first data flow based on the updated classification of the first data flow, wherein implementing the policy comprises changing a configuration or operation of a first network device.

9. The apparatus of claim 8 further comprising computer-executable instructions for causing the one or more processors to classify one or more of the data flows into a behavior group of a plurality of behavioral groups based on respective behavioral index values associated with the data flows.

10. The apparatus of claim 8 wherein the at least one behavioral index value for the first host comprises the port diversity index value.

11. The apparatus of claim 8 further comprising computer-executable instructions for causing the one or more processors to:
replace an oldest entry in the list of server port numbers with the server port number of the new data flow, when the server port number of the new data flow is not included in the list of server port numbers.

12. The apparatus of claim 8 wherein the at least one behavioral index value for the first host comprises the peer diversity index value.

13. The apparatus of claim 8 wherein the at least one behavioral index value comprises a host behavior index, and further comprising computer-executable instructions for causing the one or more processors to:
classify a third data flow associated with a third host into one of a predefined set of classifications; and
adjust a behavioral index value for the third host associated with the third data flow based on the classification of the third data flow.

14. The apparatus of claim 8 wherein the policy comprises at least one of:
bandwidth utilization control;
a partition;
a redirection policy; and
a security policy.

* * * * *